United States Patent [19]

Terada et al.

[11] Patent Number: 5,043,842

[45] Date of Patent: Aug. 27, 1991

[54] MAGNETIC HEAD CORE WITH SPECIAL GAP STRUCTURE

[75] Inventors: Nobuhiro Terada, Kasugai; Masataka Shimizu, Inuyama; Soichiro Matsuzawa, Kuwana, all of Japan

[73] Assignee: NGK Insulators, Ltd., Japan

[21] Appl. No.: 593,802

[22] Filed: Oct. 5, 1990

Related U.S. Application Data

[62] Division of Ser. No. 352,291, May 15, 1989, Pat. No. 5,003,688.

[30] Foreign Application Priority Data

May 17, 1988 [JP] Japan .................................. 63-119768

[51] Int. Cl.[5] ............................................. G11B 5/23
[52] U.S. Cl. .................................................. 360/119
[58] Field of Search ................... 360/119–120, 360/125

[56] References Cited

U.S. PATENT DOCUMENTS 3,798,758  3/1974  Stamers et al. ....................... 29/603
4,837,922  6/1989  Torin et al. ........................... 29/603

FOREIGN PATENT DOCUMENTS 60-606     1/1985  Japan ................................... 360/119
62-262209 11/1987  Japan ................................... 360/119

Primary Examiner—A. J. Heinz
Attorney, Agent, or Firm—Parkhurst, Wendel & Rossi

[57] ABSTRACT

A magnetic head core including two ferrite blocks which are bonded together so as to form a magnetic path and which includes respective two protrusions protruding from the opposed surfaces thereof. The protrusions have opposed end faces cooperating with each other to define a magnetic gap therebetween. The opposed surfaces of the two ferrite blocks cooperate with the two protrusions, to define two cutouts formed on opposite sides of the magnetic gap, such that a spacing provided between the opposed surfaces by each cutout is larger than an amount of the magnetic gap. The cutouts define an effective width of a track of the head core in which the magnetic gap is open. Each protrusion has two side surfaces inclined at an angle of 25°–75° with respect to its end face. Each cutout is defined by at least one pair of opposed ridges which are formed on the opposed surfaces of the two ferrite blocks, respectively, such that each ridge is disposed on each side of a corresponding one of the two protrusions.

8 Claims, 7 Drawing Sheets

FIG. I(a)
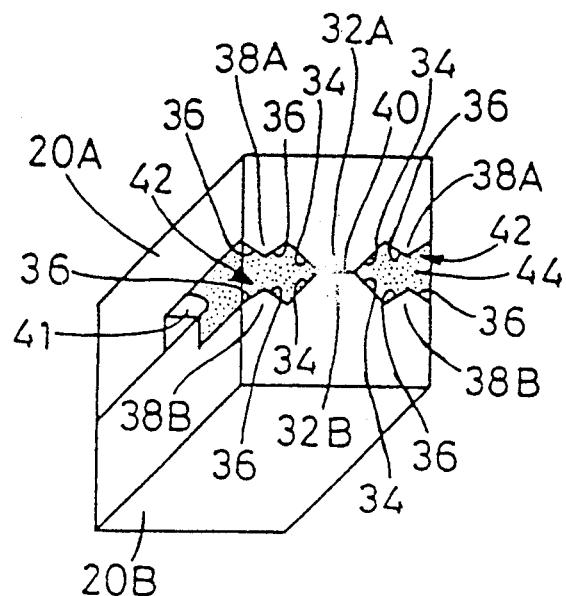
FIG. I(b)
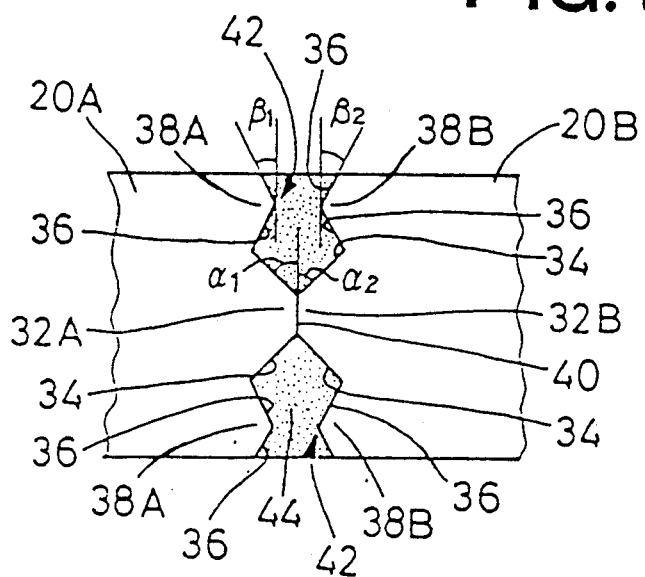

FIG. 12(a)
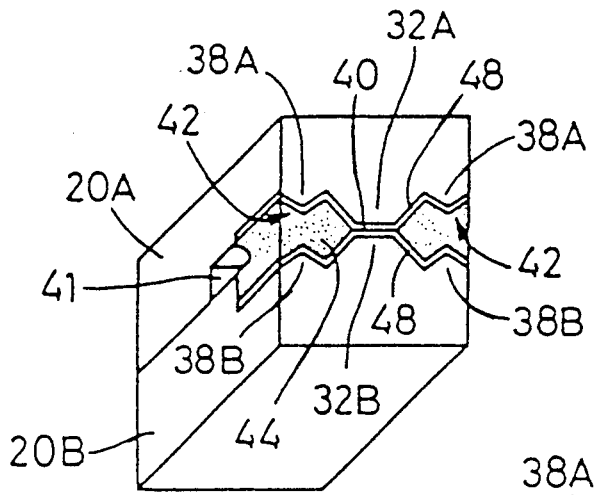
FIG. 12(b)
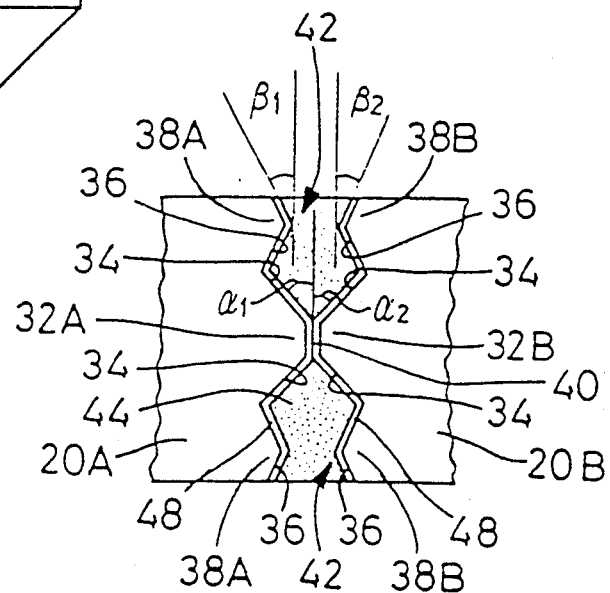
FIG. 13

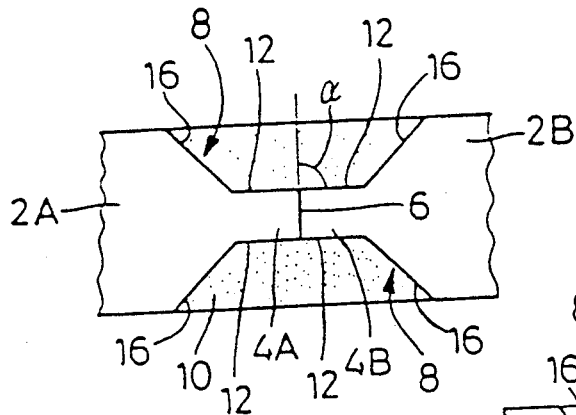
FIG. 14 PRIOR ART
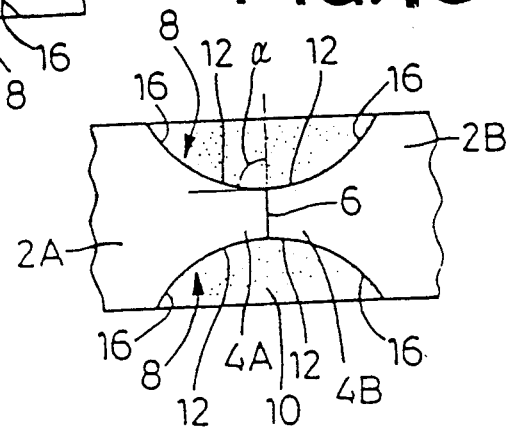
PRIOR ART FIG. 15
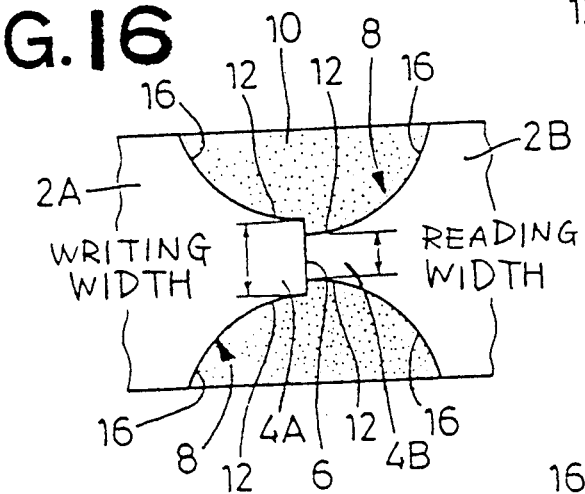
PRIOR ART FIG. 16
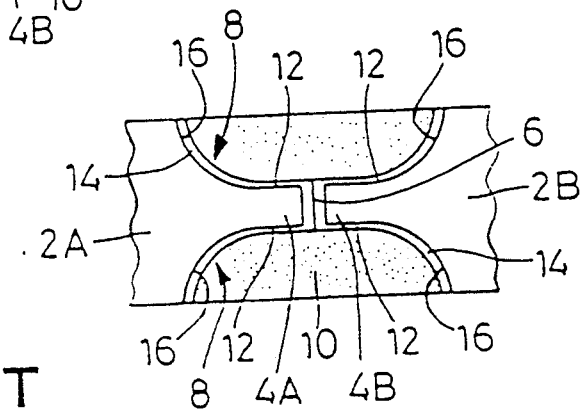
FIG. 17 PRIOR ART

MAGNETIC HEAD CORE WITH SPECIAL GAP STRUCTURE

This is a division of application Ser. No. 07/352,291 filed May 15, 1989, now U.S. Pat. No. 5,003,688.

BACKGROUND OF THE INVETNION

1. Field of the Invention

The present invention relates to a magnetic head core for a video tape recorder (VTR), a floppy disk drive (FDD) or other devices, and more particularly to such a magnetic head core which has improved overall or total characteristics and which is suitable for large-scale or mass production. The invention is also concerned with a method suitable for producing such a magnetic head core.

2. Discussion of the Prior Art

A magnetic head core for a VTR, FDD or similar device generally has a structure consisting of two or more ferrite blocks that are bonded together so as to form one magnetic path or two magnetic paths. Known magnetic head cores having an information writing/reading function are illustrated in FIGS. 14 and 15, wherein a magnetic gap 6 is defined by and between opposed magnetic-gap defining protrusions 4A, 4B which are formed so as to protrude from mutually abutting surfaces of two ferrite blocks 2A, 2B. The magnetic gap 6 has a suitable amount of spacing therebetween. On both sides of the magnetic gap 6, there are formed two track-width defining cutouts 8, 8 which define the width of the information writing/reading track. Each of these cutouts 8, 8 provides a considerably larger spacing between the two ferrite blocks 2A, 2B, than the spacing of the magnetic gap 6, in the direction perpendicular to the plane of the gap 6. In FIGS. 14 and 15, reference numeral 10 denotes masses of a non-magnetic bonding filler which fills the track-width defining cutouts 8, 8, and thereby bonds the two ferrite blocks 2A, 2B. Usually, the bonding filler 10 is a glass material.

In such a writing/reading magnetic head core constructed as described above, the track-width defining cutouts 8 are formed on both sides of the magnetic-gap defining protrusions 4A, 4B such that the spacing or distance between the two ferrite blocks 2A, 2B increases in the directions away from the opposite ends of the magnetic gap 6, toward the opposite surfaces of the ferrite blocks 2A, 2B which define their width. It is a generally recognized requirement that an angle $\alpha$ formed by an extension line of the magnetic gap 6 and side surfaces 12 of the protrusions 4A, 4B be relatively small, to enable the magnetic head core to exhibit desired operating characteristics. Described more specifically, where the angle $\alpha$ is relatively large, the magnetic head core tends to suffer from easy magnetic flux saturation at the opposite ends of the magnetic gap 6 during an information writing operation, and an excessively increased magnetic resistance at the ends of the gap 6 during an information reading operation, and consequent reduction in the information reading efficiency of the head core.

Conventionally, the track-width defining cutouts 8, 8 on both sides of the magnetic-gap defining protrusions 4A, 4B are formed by machining with a grinding wheel. This conventional method does not permit the mass production of the magnetic head core, with the sufficiently small angle $\alpha$ between the extension line of the magnetic gap 6 and the side surfaces 12, 12 of the protrusions 4A, 4B. Thus, the magnetic head core produced according to the known method is not satisfactory, in terms of information reading/writing efficiency.

To reduce the angle $\alpha$ indicated above according to the conventional method, the magnetic-gap defining protrusions 4A, 4B should be formed with tapered side surfaces, by using a grinding wheel whose grinding edge has a sufficiently smaller taper angle. This method, however, may result in a considerable amount of variation in the width of the end faces of the protrusions 4A, 4B, i.e., variation in the track width of the magnetic head, which variation arises from positioning error of the grinding wheel, wear of the grinding edge of the wheel or fluctuation in the dimensions of the ferrite blocks 2A, 2B. In view of this low accuracy of the track width, the conventional method for the mass production of the magnetic head uses a grinding wheel whose working angle corresponding to the angle $\alpha$ is sufficiently large or equal to 90°, for forming the magnetic-gap defining protrusions 4A, 4B (cutouts 8 or side surfaces 12). Accordingly, the angle $\alpha$ between the plane of the magnetic gap 6 and the side surfaces 12 of the protrusions 4A, 4B is necessarily large in the known magnetic head cores, as indicated in FIGS. 14 and 15, whereby the information writing and reading characteristics of the head cores are not practically satisfactory, or required to be further improved.

Keeping pace with an increasing requirement for high-density storage of information per unit area of a storage medium, the medium has a tendency toward reduction in the spacing between the adjacent tracks. The reduced track spacing of the medium leads to an increased crosstalk between the adjacent tracks during an information reading operation of the magnetic head core, namely, a deteriorated off-track operating characteristic of the head core. To minimize the problem of this deteriorated off-track characteristic, there is proposed a magnetic head core as shown in FIG. 16, wherein the width of the end face of one of the two magnetic-gap defining protrusions 4A, 4B is made slightly larger than that of the other protrusion, so that the information writing track width is substantially larger than the information reading track width, as indicated in the figure, due to a so-called "fringing effect" which is provided based on leakage of the magnetic flux. This arrangement reduces the off-track crosstalk, thereby improving the off-tracking operating characteristic of the head core.

In the conventional magnetic head core of the type shown in FIG. 16, too, the angle $\alpha$ formed between the plane of the magnetic gap 6 and the side surfaces 12 of the protrusions 4A, 4B cannot be made sufficiently small according to the conventional mass production method using a grinding wheel. Hence, the head core does not provide a sufficient fringing effect, and cannot have a sufficiently enlarged effective writing width. In other words, the conventional method does not provide a significant improvement in the off-track operating characteristic of the head core, and does not enable the head core to satisfy the requirement for the high-density storage of information per unit area of a magnetic storage medium.

On the other hand, the provision of a magnetic film such as a film of Sendust for a magnetic gap of the magnetic head core is known to be effective to attain the high-density storage of information relying on a high value of coercivity of a magnetic storage medium.

Described more particularly, the magnetic film having a higher saturation magnetic flux density than the ferrite blocks is applied so as to cover the end face of at least one of the two magnetic-gap defining protrusions 4A, 4B of the ferrite blocks, so as to provide a so-called metal-in magnetic gap. A sputtering techinque is known to be more suitable for forming such a magnetic film or films, than vacuum vapor deposition, ion plating, CVD (chemical vapor deposition), plating or other methods, because the sputtering method suffers from a comparatively small amount of fluctuation in the composition of the film(s) and does not considerably limit the magnetic material to be used for the film(s). According to the conventional mass production method, the magnetic film is formed by sputtering so as to cover the entire surface area of each magnetic-gap defining protrusion 4A, 4B, as indicated at 14 in FIG. 17. Since the side surfaces 12 and the end faces of the protrusions 4A, 4B form a relatively large angle (i.e., 90° in this example) therebetween, the magnetic film 14 inevitably has a reduced thickness and insufficient adhesion to the appropriate surface portion at and near the opposite ends of the magnetic gap 6. Consequently, the magnetic film 14 tends to be separated easily from the corner portions of the protrusion 4A, 4B when the ferrite blocks 2A, 2B are bonded together with a bonding filler 10. The magnetic material of the separated magnetic film 14 may disperse, migrate or diffuse into the bonding filler 10, and the slidability of the head core at its sliding surface with respect to a storage medium may be deteriorated by the magnetic material which diffuses to the surface portions of the bonding filler 10. Further, the portion of the magnetic film 14 existing adjacent to the magnetic gap 6 may cause a substantial change in the track width of the head core, which is a serious problem with the magnetic head core.

The magnetic head core of the type described above may pick up signals from the tracks adjacent to the track being read, or suffer from the so-called crosstalk, if the surfaces of the track-width defining cutouts 8, 8 of the two ferrite blocks 2A, 2B have portions which are parallel or almost parallel to the plane of the magnetic gap 6. To avoid this crosstalk, the cutouts 8 are formed with inclined surfaces 16 which are inclined at a suitable angle with respect to the plane of the magnetic gap 6, as indicated in FIGS. 14–17. In the examples of FIGS. 15–17, the inclined surfaces 16 are constituted by curved surfaces which terminate in the curved side surfaces 12 of the protrusions 4A, 4B, such that the surfaces 16, 12 cooperate to form a curvature.

SUMMARY OF THE INVENTION

It is therefore a first object of the present invention to provide a magnetic head core which is suitable for efficient mass production, and which assures more excellent information writing and reading characteristics, being operable with a high-density storage medium, with a reduced crosstalk and improved off-track operating characteristic, than the known counterpart whose track-width defining cutouts are formed by a grinding wheel.

A second object of the invention is to provide such a magnetic head core wherein the end face of at least one of the magnetic-gap defining protrusions is covered by a magnetic film, so as to provide a metal-in magnetic gap, and wherein the magnetic film is protected from separation from the ferrite block, even where the film is sputtered over the entire surface area of the magnetic-gap defining protrusion.

A third object of the invention is to provide a method suitable for producing the magnetic head core as indicated above.

The first object may be achieved according to one aspect of the present invention, which provides a magnetic head core including two ferrite blocks which are bonded together so as to form a magnetic path. The two ferrite blocks have opposed surfaces and comprise respective two protrusions which protrude from respective portions of the opposed surfaces and have opposed end faces cooperating with each other to define a magnetic gap therebetween. The opposed surfaces of the two ferrite blocks cooperate with the two protrusions, to define two cutouts formed on opposite sides of the magnetic gap, such that a spacing provided between the opposed surfaces by each of the two cutouts is larger than an amount of the magnetic gap between the end faces. The cutouts define an effective width of a track of the head core in which the magnetic gap is open. Each of the two protrusions of the ferrite blocks has two side surfaces each of which is inclined at an angle of 25°–75° with respect to the end faces defining the magnetic gap. Each of the two cutouts is defined by at least one pair of opposed ridges which are formed on the opposed surfaces of the two ferrite blocks, respectively, such that each of the opposed ridges is disposed on each side of a corresponding one of the two protrusions.

In the magnetic head core of the present invention constructed as described above, the inclination of the two side surfaces of the protrusion on each ferrite block at a comparatively small angle not exceeding 75° with respect to the plane of the magnetic gap assures considerably improved information writing and reading characteristics, without an easy magnetic flux saturation at the ends of the magnetic gap during information writing, without an undesirably increased magnetic resistance at the ends of the magnetic gap during information reading. Further, the small inclination angle of the side surfaces permits enhanced off-track operating characteristic based on the fringing effect indicated above. If the inclination angle exceeds 80°, the writing and reading characteristics of the head core are deteriorated, and a significant improvement in the off-track characteristic based on the fringing effect cannot be expected. In this respect, the inclination angle of the side surfaces of the protrusions should not exceed 75°.

Moreover, since the inclination angle of the side surfaces of the protrusions is at least 25° with respect to the plane of the magnetic gap, the magnetic head core is effectively protected against an undesirable increase in the effective information writing width. If the inclination angle is less than 25°, the effective writing width becomes considerably larger than the effective reading width, due to the fringing effect, and the off-track characteristic is deteriorated. As a result, the magnetic head core cannot be suitably used with a high-density magnetic storage medium having a small track-to-track spacing. To avoid these drawbacks, the inclination angle should not be smaller than 25°, and should preferably be 40° or larger.

In the magnetic head core of the type indicated above, the portions of the opposed surfaces of the ferrite blocks, which define the cutouts on both sides of the magnetic gap so as to define the effective track width, should be inclined with respect to the magnetic gap, in order to avoid or minimize the crosstalk during information reading. In the known magnetic head core prepared according to the conventional method, the inclined surfaces defining the cutouts are formed as extensions of the side surfaces of the protrusions such that the inclined cutout surfaces are considerably spaced from the end faces of the protrusions (from the magnetic gap) in the direction perpendicular to the plane of the magnetic gap. This large spacing between the magnetic gap and the inclined cutout surfaces results in significant reduction in the production efficiency of the head core.

The protrusions which define the maganetic gap may be advantageously formed by etching the appropriate surfaces of the ferrite blocks or blanks. For increased production efficiency, it is desirable that the surfaces defining the cutouts be formed by etching, concurrently with the protrusions. However, the conventionally formed inclined cutout surfaces extending from the side surfaces of the protrusions cannot be efficiently formed by etching, since the large spacing between the magnetic gap (top or end faces of the protrusions) and the cutout surfaces indicates an accordingly large depth of etching required to form the inclined cutout surfaces. Therefore, the etching process to concurrently produce the protrusions and the inclined cutout surfaces requires a considerably long time, thereby lowering the production efficiency of the magnetic head core.

In the instant magnetic head core, each cutout formed on each side of the magnetic gap or protrusions is defined by at least one ridge. Since the ridges defining the cutouts extend in the same direction as the protrusions, the etching depth is considerably smaller than that required for the conventional head core described above. Since each ridge is defined by two sloped sides, the cutouts are defined by the inclined side surfaces of the ridges. Therefore, the desired profile of the cutouts can be obtained with a considerably reduced etching time, and the production efficiency of the magnetic head core is significantly improved.

Preferably, the angle of inclination of each side surface of the ridges with respect to the plane of the magnetic gap is selected within a range of 10°–70°.

The second object may be attained according to one form of the magnetic head core of the invention, wherein at least one of the two ferrite blocks has a magnetic film which covers at least the end face of the corresponding one of the two protrusions. The magnetic film is formed of a magnetic material which has a higher saturation magnetic flux density than the ferrite blocks.

In the above form of the invention, the magnetic film may be suitably formed by sputtering, even where the film covers the entire area of the appropriate surface from which the protrusion protrude, since the side surfaces of the protrusions are inclined at 25°–75° with respect to the end faces of the protrusions. Namely, the protrusion or protrusions may be covered by the magnetic film or films which has/have a sufficient thickness and a sufficient value of adhesion to the appropriate surface. Therefore, the magnetic film will not be separated from the side surfaces of the protrusion when the ferrite blocks are bonded together. Thus, the diffusion or permeation of the magnetic material of the film into the bonding filler in the cutouts is effectively prevented.

The third object of the invention may be achieved according to another aspect of the invention, which provides a method of producing a magnetic head core constructed as described above, the method comprising the steps of: (a) preparing two ferrite blanks corresponding to the two ferrite blocks, each of the two ferrite blanks having opposed major surfaces; (b) forming a pattern of etching mask on one of opposed major surfaces of each ferrite blank, such that the pattern of etching mask comprises a relatively wide resist portion corresponding to the corresponding one of the two protrusions, and at least two relatively narrow resist portions corresponding to the two cutouts; (c) subjecting the masked major surface of each ferrite blank to an etching operation through the patterned of etching mask, to form a corresponding one of the two protrusions and at least one ridge formed on each side of the corresponding one protrusion, such that the corresponding one protrusion has two side surfaces each of which is inclined at an angle of 25°–75° with respect to the end faces defining the magnetic gap; (d) and bonding together the two ferrite blanks such that the opposed end faces of the two protrusions formed on the etched surfaces of the two ferrite blanks define the magnetic gap therebetween, while the at least one ridge formed on each side of one of the two protrusions cooperates with the at least one ridge formed on each side of the other protrusion, to define the above-indicated two cutouts.

The method may further comprise the step of effecting another etching operation for etching the end face of at least one of the two protrusions formed on the two ferrite blanks, such that a total etching depth is equal to the amount of the magnetic gap.

For efficient production of the magnetic head core, the patterned etching mask has a plurality of groups of resist portions, each group including the relatively wide resist portion and the at least two relatively narrow resist portions. In this case, the method further comprises the step of cutting a ferrite assembly of the two ferrite blanks bonded together, to provide a plurality of magnetic head cores each constructed as described above.

The method may further comprise the step of forming a magnetic film such that the magnetic film covers at least the end face of at least one of the two protrusions. This step is carried out before the ferrite blanks are bonded together. The magnetic film is formed of a magnetic material which has a higher saturation magnetic flux density than the ferrite blanks.

BRIEF DESCRIPTION OF THE DRAWINGS

The foregoing and other objects, features and advantages of the present invention will become more apparent by reading the following detailed description of presently preferred embodiments of the invention, when considered in conjunction with the accompanying drawings, in which:

FIG. 1(a) is a perspective view of one embodiment of the present invention in the form of a writing/erasing magnetic head core for a video tape recorder;

FIG. 1(b) is a fragmentary plan view of the magnetic head core of FIG. 1;

FIGS. 2 through 10 are views for explaining an example of a process for manufacturing the magnetic head core of FIGS. 1(a) and 1(b);

FIG. 2 is a perspective view of one of two ferrite blanks used for preparing two ferrite blocks which are bonded together to produce the magnetic head core of FIGS. 1(a) and 1(b);

FIGS. 3 and 4 are a perspective view and a fragmentary front elevational view, illustrating a patterned of resist etching mask formed on the ferrite blank of FIG. 2;

FIG. 6 is a fragmentary perspective view of the ferrite blank as shown in FIG. 5(b);

FIG. 7 is a fragmentary perspective view of the ferrite blank on which is formed an etching mask for defining an amount of magnetic gaps;

FIG. 8 is a fragmentary perspective view of the ferrite block prepared by etching the ferrite blank through the etching mask of FIG. 7 and forming a coil-winding groove in the etched surface;

FIG. 9 is a fragmentary perspective view of a ferrite assembly consisting of the two ferrite blocks of FIG. 8 which are bonded together;

FIG. 10 is a fragmentary plan view of the ferrite assembly of FIG. 9, illustrating cutting planes in which the ferrite assembly is cut to provide magnetic head cores;

FIGS. 12(a) and 12(b) are views corresponding to those of FIGS. 1(a) and 1(b), showing a further embodiment of the invention;

FIG. 13 is a view corresponding to that of FIG. 1(a), depicting a still further embodiment of the invention; and FIGS. 14, 15, 16 and 17 are views corresponding to that of FIG. 1(b), illustrating known magnetic head cores.

DETAILED DESCRIPTION OF THE PREFERRED EMBODIMENTS

While several presently preferred embodiments of the invention will be described, the process of manufacturing the first embodiment of the invention as applied to a VTR magnetic head core constructed as shown in FIGS. 1(a) and 1(b) will be first described in greater detail, and the constructions of the first and other embodiments will be described, for easier understanding of the principle of the present invention.

Figure 2:
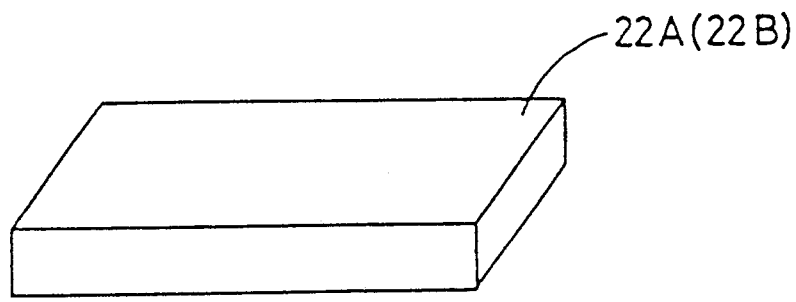

For manufacturing the VTR magnetic head core of FIGS. 1(a) and 1(b) which consist of two ferrite blocks 20A, 20B, there are prepared two elongate rectangular ferrite blanks 22A, 22B corresponding to the two ferrite blocks 20A, 20B. One of these two ferrite blanks 22A, 22B is shown in FIG. 2. One of two major surfaces of each ferrite blank 22A, 22B is mirror-polished. This mirror-polished surface corresponds to a surface of the ferrite block which cooperates with the corresponding surface of the other ferrite block, to define a magnetic gap of the magnetic head core. In other words, the ferrite blanks are butted and bonded together at the mirror-polished surfaces.

The ferrite blanks 22A, 22B for the ferrite blocks 20A, 20B are formed of a known ferrite material having a high value of magnetic permeability. For instance, each ferrite blank 22A, 22B is preferably formed of a single crystal or a polycrytal of Mn—Zn ferrite or Ni—Zn ferrite, or a ferrite structure consisting of a monocrystal portion and a polycrystal portion. However, a single crystal ferrite is particularly preferred, for improved accuracy of etching of the ferrite blank and accordingly enhanced dimensioning accuracy of the writing/reading track of the magnetic head core produced. Where the single crystal ferrite is used for the ferrite blanks, one of the following crystal planes of the crystal is desirably used as the mirror-polished surface of the ferrite blank: (100), (110), (211), (311), (332) and (611).

In the present embodiment, three ferrite blocks 20A, 20B are obtained from the corresponding ferrite blanks 22A, 22B, and therefore each ferrite blank 22A, 22B has a length which is more than three times as large as that of the ferrite block 20A, 20B.

Figure 3:
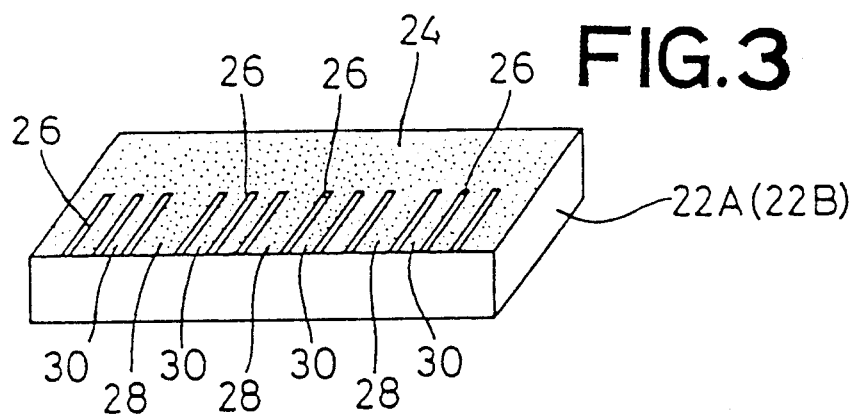
Figure 4:
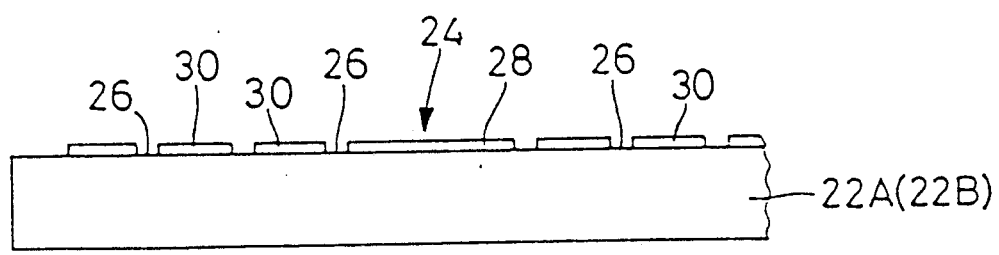

Initially, an etching mask 24 consisting of a resist is formed in a predetermined pattern on the mirror-polished surface of each ferrite blank 22A, 22B, as shown in FIG. 3. The patterned of the etching mask 24 is defined by a plurality of elongate rectangular exposed areas 26 of the mirror-polished surface which are not covered by the resist. As shown in FIGS. 3 and 4, the rectangular exposed areas 26 extend parallel to each other over a suitable distance in the direction of width of the ferrite blank 22A, 22B, from one of opposite ends of the mirror-polished surface which corresponds to the sliding contact surface of the produced magnetic head core for slidable contact with a magnetic data storage medium (e.g., magnetic disk). The rectangular exposed areas 26 consist of three groups each consisting of three areas, which groups are spaced from each other in the direction of length of the ferrite blank 22A, 22B, such that a relatively wide first rectangular resist portion 28 of the mask 24 is positioned between the adjacent two groups of rectangular exposed areas 26. The areas covered by the first rectangular resist portions 28 provide gap defining surfaces of the magnetic head core produced. The etching mask 24 of resist further includes relatively narrow second resist portions 30, each positioned between the adjacent two rectangular exposed areas 26 of each group. Namely, the two areas of the mirror-polished surface of the ferrite blank 22A, 22B defined by the three exposed areas 26 of each group are covered by the respective two second resist portions 30, and these two areas correspond to track-width defining cutouts 42 (which will be described) of the produced magnetic head core.

The above-described pattern of the etching mask 24 is formed by exposing the resist layer previously formed on the mirror-polished surface of the ferrite blank 22A, 22B, to radiation through the appropriate photomask. The mirror-polished surface covered by the thus prepared etching mask 24 is then subjected to an etching process. The etching is effected until the width of each area of the mirror-polished surface which is covered by each relatively wide first resist portion 28 of the mask 24 is reduced to a desired width of the writing/reading track (width of the end face of a magnetic-gap defining protrusion 32A, 32B) of the magnetic head core, due to removal by etching of the ferrite stock by an etching solution which contacts the ferrite mass through the rectangular exposed areas 26.

Figure 5A:
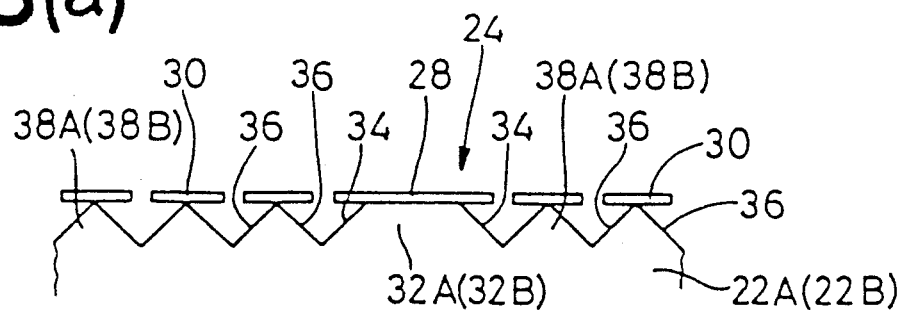
FIGS. 5(a) and 5(b) are fragmentary schematic front elevational views, respectively showing the ferrite blank in the process of etching through the etching mask of FIGS. 3 and 4, and the ferrite blank at the end of the etching process.
Figure 5B:
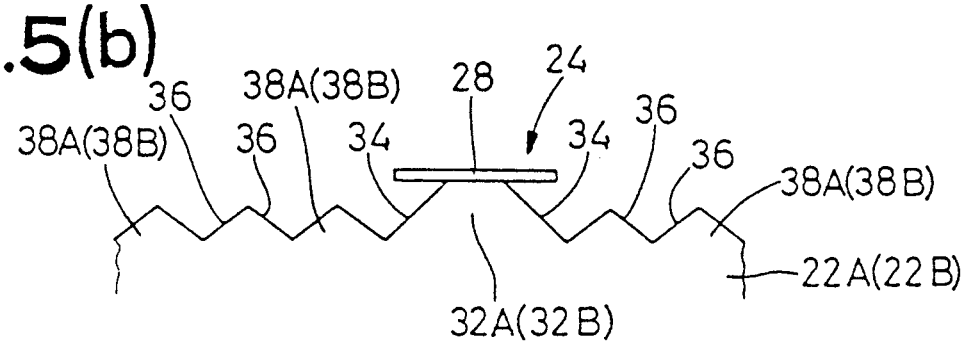

FIG. 5(a) indicates the condition of the mirror-polished surface of the ferrite blank 22A, 22B in the etching process, in which the width of the areas of the mirror-polished surface covered by the relatively narrow second resist portions 30 of the etching mask 24 is reduced to substantially zero, due to the etching removal of the ferrite stock. The etching operation further proceeds to have a further etching depth at the areas covered by the second resist portions 30, until the width of each area covered by the first resist portion 28 becomes equal to the desired width of the end face of the magnetic-gap defining protrusion 32A, 32B (width of the track of the head core). The finally etched condition of the ferrite blank 22A, 22B is illustrated in the front elevational view of FIG. 5(b), and in the perspective view of FIG. 6.

Figure 6:
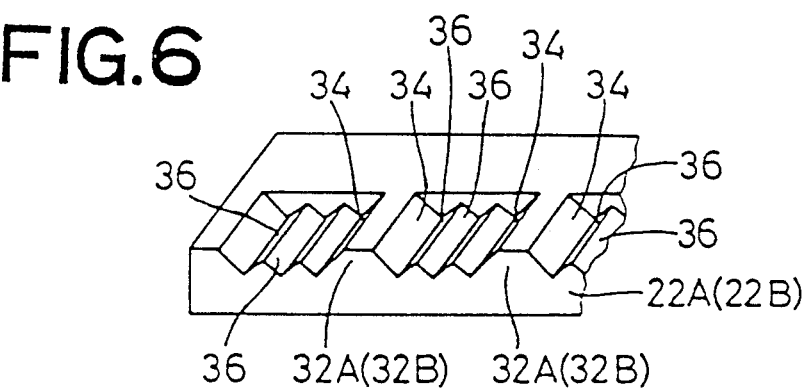

Thus, the etching process of the ferrite blanks 22A, 22B results in the formation of the magnetic-gap defining protrusions 32A, 32B whose end face widths define the width of the writing/reading track of the magnetic head core produced. More specifically, each magnetic-gap defining protrusion 32A, 32B has two side surfaces 34, 34 which are formed by etching, as is apparent from FIGS. 5(a), 5(b) and 6. The side surfaces 34, 34 are inclined at an angle α1 (for the ferrite block 20A), α2 (for the ferrite block 20B), with respect to the plane of the end face (top face as seen in FIG. 6) of the protrusion 32A, 32B. Please refer to FIG. 1(b). The angles α1, α2 of inclination of the inclined side surfaces 34 are selected generally within a range of 25°-75°, preferably within a range of 40°-75°, depending upon the crystal direction of the mirror-polished surface of the blanks 22A, 22B, and the etching conditions such as temperature and concentration of the etching solution.

Further, the etched mirror-polished surface of the ferrite blank 22A, 22B is formed with ridges 38A, 38B which correspond to the longitudinally extending centerlines of the relatively narrow second resist portions 30 of the etching mask 24. Each ridge 38A, 38B is defined by two side surfaces 36, 36 which are inclined at an angle β1 (for the ferrite block 20A), β2 (for the ferrite block 20B), with respect to the plane of the end face (top face as seen in FIG. 6) of the protrusion 32A, 32B. See FIG. 1(b). These ridges 38A, 38B, or inclined side surfaces 36, 36 provide the track-width defining cutouts 42. The angles β1, β2, of inclination are selected generally within a range of 10°-70°, depending upon the crystal direction of the mirror-polished surface, etching conditions, and width of the second resist portions 30. The crest of each ridge 38A, 38B is spaced from the end face of the magnetic-gap defining protrusion 32A, 32B, by about 10 microns in the etching direction (in the direction of thickness of the ferrite blank 22A, 22B). In the present embodiment, therefore, there exists a gap or clearance of more than 20 microns between the crests of the pair of aligned opposed ridges 38A, 38B of the two ferrite blocks 20A, 20B of the magnetic head core produced. Accordingly, the track-width defining cutouts 42 defined by the ridges 38A, 38B are substantially inhibited from functioning as an information writing gap.

In the instant embodiment, the two etched ferrite blanks 22A and 22B have the same configuration. Namely, the angles α1 and β1 of the ferrite blank 22A are equal to the respective angles α2 and β2 of the ferrite blank 22B the magnetic-gap defining protrusions 32A and 32B have the same dimenions and shape, and therfore have the same width at the end faces.

While the etching process illustrated above defines the width of the magnetic-gap defining protrusions 2A, 32B or the width of the track of the head core, but does not define the depth of a magnetic gap 40 defined by and between the end faces of the protrusions 32A, 32B. However, the etching process may be adapted to define not only the width of the magnetic gap 40, but also the depth of the gap 40.

After the above etching operation is completed, the etching masks 24 are removed from the ferrite blanks 22A, 22B. Then, another patterned of etching mask 24 is formed on the mirror-polished surface of the ferrite blank 22A. This etching mask 24 is patterned so that the inner end portions of the end faces or top faces of the magnetic-gap defining protrusions 32A, and the inclined side surfaces 34, 36 are exposed. With an etching operation performed with this etching mask 24, the exposed portions of the end faces of the protrusions 32A (and the side surfaces 34, 36) are etched to a desired depth which gives the predetermined amount of the magnetic gap 40 of the magnetic head core, which gap amount is defined between the etched end face portion of the ferrite block 20A, and the non-etched end face of the ferrite block 20B.

It will be obvious that the above etching operation to give the magnetic gap 40 is carried out on the ferrite blank 22B, rather than on the ferrite blank 22A, or on both the ferrite blank 22A and the ferrite blank 22B. While the etching operations of the ferrite blocks 22A, 22B described above may be performed in an ordinary electrolytic or chemical etching process, it is particularly preferred to practice a chemical etching method using an aqueous solution containing phosphoric acid, as disclosed in laid-open Publication No. 62-83483 of unexamined Japanese Patent Application No. 60-222388.

Figure 8:
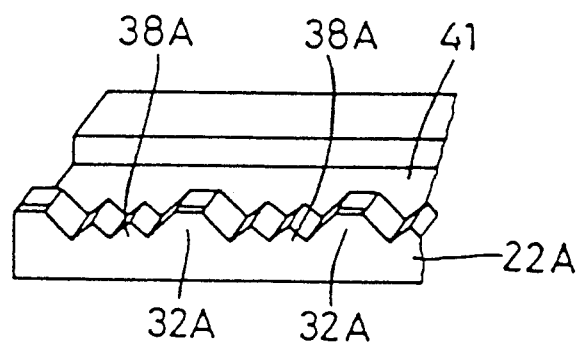

After the etching to define the amount of the magnetic gap 40 is completed, a coil-winding groove 41 is formed in at least one of the ferrite blanks 22A, 22B (in only the ferrite blank 22A, in this specific example), such that the groove 41 extends in the longitudinal direction of the blank 22A, 22B, as shown in FIG. 8. The width of the groove 41 is determined so as to define the desired depth of the magnetic gap 40.

Figure 9:
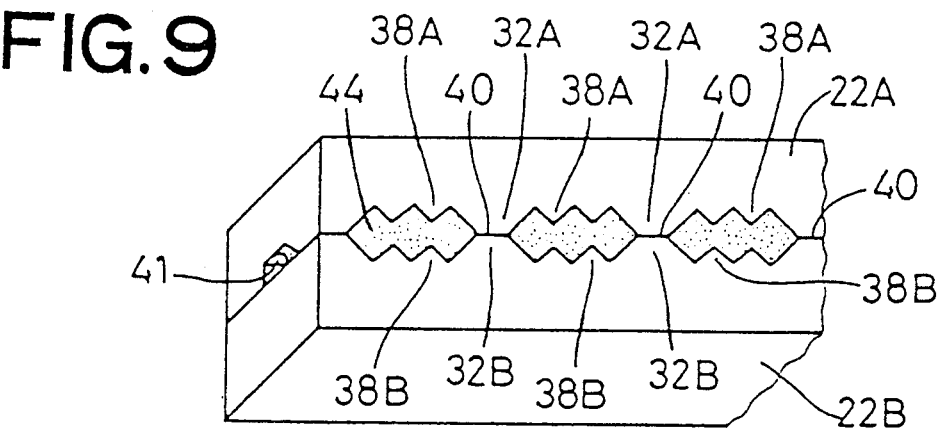

The two ferrite blanks 22A, 22B thus processed are butted together at their abutting surfaces (etched mirror-polished surfaces), such that the end faces of the magnetic-gap defining protrusions 32A, 32B define the magnetic gaps 40, while the inclined surfaces 34, 36 (ridges 38A, 38B) define the track-width defining cutouts 42. Then, the magnetic gaps 40 and the cutouts 42 are filled with masses of bonding fillers 44, whereby the two ferrite blanks 22A, 22B are bonded together into a ferrite assembly. FIG. 9 shows the ferrite assembly after the removal of the front end portions of the blanks 22A, 22B which have not been etched in the last etching process with the mask 24 of FIG. 7. Namely, the cut surface of the ferrite assembly of FIG. 9 provides the sliding contact surface of the magnetic head core, in which the magnetic gap 40 is open.

Figure 10:
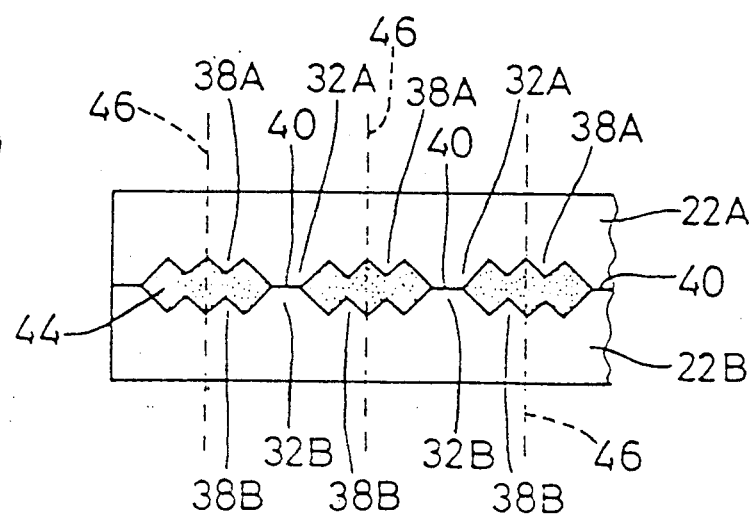

The thus prepared ferrite assembly of FIG. 9 consisting of the bonded two ferrite blanks 22A, 22B is then cut along parallel planes perpendicular to the length of the ferrite assembly, indicated in broken lines 46 in FIG. 10, so as to provide the three magnetic head cores each consisting of the ferrite blocks 20A, 20B, as shown in FIGS. 1(a) and 1(b). Each magnetic head core has the magnetic gap 40 which is defined by and between the opposed end faces of the magnetic-gap defining protrusions 32A, 32B, the gap 40 having the predetermined amount, i.e., distance between the end faces of the protrusions 32A, 32B. The magnetic head core further has the pair of track-width defining cutouts 42, 42 formed on both sides of the magnetic gap 40, so that the cutouts 42, 42 define an effective width of the track of the head core. Certainly, the cutouts 42 are gaps which are considerably larger than the amount of the magnetic gap 40. In this magnetic head core, a substantially annular magnetic path is formed around a coil-winding aperture formed by the coil-winding groove 41.

The groove 41 is usually formed by a grinding wheel, and the grooving operation is performed after the etching operation to provide the magnetic gap 40. However, the grooving operation may precede the above etching operation. The bonding filler 44 may be a glass, ceramic or other inorganic bonding material, or a hard resin material. In this specific example, a glass material is used as the bonding filler 44, for improved operating stability of the head core, in terms of smoothness of sliding contact between the sliding contact surface of the head core with a magnetic data storage medium. In cutting the ferrite assembly of FIG. 9, it is possible to incline the cutting planes 46 by a suitable azimuth angle, as known in the art.

In the thus produced magnetic head core as shown in FIGS. 1(a) and 1(b), the side surfaces 34, 34 of the magnetic-gap defining protrusions 32A, 32B defining the magnetic gap 40 are inclined with respect to the plane of the magnetic gap 40 (with respect to the end faces of the protrusions 32A, 32B), by the angles $\alpha 1$, $\beta 2$ which are held generally within the range of 25°–75°, preferably within the range of 40°–75°, as described above. These inclined side surfaces 34, 34 assure excellent information writing and reading operations, without easy magnetic flux saturation at the opposite ends of the magnetic gap 40 and an excessively large effective width of the track during an information writing operation, and without an excessively high magnetic resistance at the opposite ends of the magnetic gap 40 during an information reading operation.

It is also noted that the track-width defining cutouts 42 on the opposite sides of the magnetic gap 40 are formed by the ridges 38A, 38B whose side surfaces 36, 36 are inclined with respect to the plane of the magnetic gap 40, by the angles $\beta 1$, $\beta 2$ which are at least 10°. The thus formed ridges 38A, 38B or inclined side surfaces 36, 36 are effective to avoid an excessive reduction in the azimuth loss of the magnetic head core upon information reading, thereby preventing a crosstalk between a track being read and the adjacent track. Further, the inclination of the side surfaces 36, 36 permits the ridges 38A, 38B to be formed concurrently with the magnetic-gap defining protrusions 32A, 32B, without an excessive amount of depth of etching of the ferrite blanks 22A, 22B. This indicates relatively increased production efficiency of productivity of the instant magnetic head core, while assuring excellent information writing and reading characteristics, without an undesirably increased effective writing width, and with a minimum amount of crosstalk between the adjacent tracks.

If the angles of inclination $\beta 1$, $\beta 2$ of the side surfaces 36 of the ridges 38A, 38B with respect to the magnetic gap 40 are excessively small, the magnetic head core tends to suffer from the crosstalk upon information reading. For this reason, the inclination angles $\beta 1$ and $\beta 2$ should desirably be 10° or larger. However, the inclination angles $\beta 1$, $\beta 2$ exceeding about 80° causes insufficient mechanical strength of the ridges 38A, 38B. Therefore, the inclination angles $\beta 1$, $\beta 2$ should preferably be no more than 70°.

Since the inclination angles $\alpha 1$, $\alpha 2$ of the side surfaces 34, 34 of the magnetic-gap defining protrusions 32A, 32B with respect to the plane of the magnetic gap 40 are smaller than 75°, a sum of these angles $\alpha 1$ and $\alpha 2$ is smaller than that of the conventional magnetic head core which is produced on a large-lot size. Accordingly, the instant magnetic head core provides an increased fringing effect at its boundary between the magnetic gap 40 and the track-width defining cutouts 42, assuring a higher degree of adaptability to increased information storage density per unit area of a magnetic data storage medium, as compared with the conventional head core.

In the magnetic head core of FIGS. 1(a) and 1(b), the end faces of the magnetic-gap defining protrusions 32A, 32B of the ferrite blocks 20A, 20B have the same width, which determines the width of the magnetic gap 40, i.e., the width of the track of the head core. In this case, however, the sufficiently large fringing effect cannot be expected at the boundary between the magnetic gap 40 and the track-width defining cutouts 42, where the inclination angles $\alpha 1$, $\alpha 2$ of the side surfaces 34, 34 of the protrusions 32A, 32B with respect to the plane of the magnetic gap 40 are relatively large. That is, the magnetic head having the relatively large inclination angles $\alpha 1$, $\alpha 2$ is not sufficiently capable of dealing with a magnetic data storage medium wherein the spacing between the tracks is small enough to permit increased density of information storage per unit area of the medium surface.

Figure 11A:
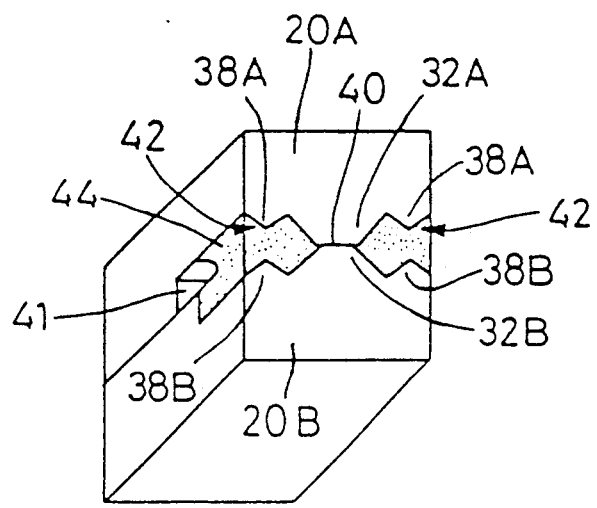
FIGS. 11(a) and 11(b) are views corresponding to those of FIGS. 1(a) and 1(b), showing another embodiment of the present invention.
Figure 11B:
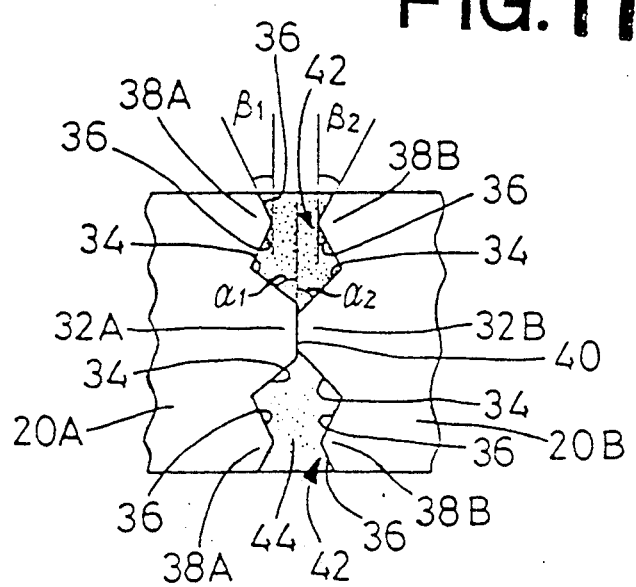

When it is desired to have the magnetic head which provides a sufficient fringing effect in order to permit the high-density information storage on a storage medium with high density tracks, the magnetic head core of FIGS. 1(a) and 1(b) may be modified as shown in FIGS. 11(a) and 1(b). In this modified magnetic head core, one of the magnetic-gap defining protrusions 32A, 32B of the ferrite blocks 20A, 20B has a slightly wider end face or a slightly larger track width, than the other protrusions 32A, 32B. The magnetic head core of FIGS. 11(a) and 11(b) can be produced with high efficiency, in the same manner as employed for producing the head core of the preceding embodiment, except that the first rectangular resist portions 28 of the etching masks 24 formed on the two ferrite blanks 22A, 22B have different widths, or the blanks 22A, 22B are etched to different depths, in order to form the protrusions 32A, 32B whose end faces have different widths.

Referring next to FIGS. 12(a) and 12(b), there is shown another modified embodiment of the magnetic head core of the present invention, also adapted for use with a video tape recorder. In this embodiment, the end faces and inclined side surfaces 34, 34 of the protrusions 32A, 32B and the inclined side surfaces 36, 36 of the ridges 38A, 38B of the ferrite blocks 20A, 20B are covered by respective magnetic films 48, 48 which are made of a magnetic material whose saturation magnetic flux density is higher than that of the ferrite blocks 20A, 20B. The magnetic gap 40 and the track-width defining cutouts 42 which are coated with these magnetic films 48, 48 permit the magnetic head high-density storage of information on a magnetic storage medium with a relatively high degree of coercivity.

The magnetic films 48, 48 are applied to the ferrite blanks 22A, 22B, after the etching operations to form the magnetic-gap defining protrusions 32A, 32B and the ridges 38A, 38B, and before the etched ferrite blanks 22A, 22B are bonded together. Since the side surfaces 34, 34 of the protrusions 32A, 32B are inclined at angle 75° or less with respect to the planes of the end faces of the protrusions 32A, 32B, the magnetic films 48, 48 may be formed on the inclined side surfaces 34, 34, with a sufficiently large thickness and a high degree of adhesion to the surfaces 34, even where the films 48 are formed by a sputtering technique. The magnetic films 48 will not be separated or flake off from the inclined side surfaces 34 when the ferrite blanks 22A, 22B are bonded together with the bonding filler 44. That is, the inclination of the side surfaces 34 prevents otherwise possible separation of the magnetic films 48, which may lead to dispersion or diffusion of the magnetic material into the masses of the bonding filler 44, and consequent deterioration of the slidability of the head core with respect to the magnetic storage medium, and/or a substantive fluctuation of the track width of the head core from the nominal value.

The magnetic films 48 may consist of a known crystalline alloy, typical exmples of which include Fe-Si alloy (containing 6.5% by weight of Si), Fe—Si—Al alloy (known as "Sendust" consisting of 5-11% by weight of Si, 3-8% by weight of Al, and the balance being Fe), and Ni—Fe alloy (known as "Permalloy"). Also, the magnetic films 48 may consist of a non-crystalline metal-metalloid alloy such as Fe—Co—Si—B alloy, or a non-crystalline metal-metal alloy such as Co—Zr alloy and Co—Zr—Nb alloy. Where the Fe—Si—Al alloy is used, no more than 5% by weight of Cr, Ti, Ta or other suitable element is usually added to increase- the corrosion resistance of the magnetic films 48.

It is preferred that the magnetic films 48 be formed by sputtering, since the sputtering suffers from relatively reduced local variation in the composition of the formed films 48, and does not considerably limit the material to be used. However, the method of forming the magnetic films 48 is not limited to the sputtering, but other methods such as ion-plating, chemical vapor deposition (CVD) and plating may be alternatively used.

While the magnetic films 48 are formed on both of the ferrite blocks 20A, 20B in the embodiment of FIGS. 12(a) and 12(b), a magnetic film may be fomred on only one of the two ferrite blocks 20A, 20B. Further, a magnetic film may be applied so as to cover only the end face of one of the two magnetic-gap defining protrusions 32A, 32B.

For increasing the adhesion of the magnetic films 48 to the ferrite blocks 20A, 20B, an undercoat consisting of a glass material or containing at least one magnetic material such as Fe, Ni and Co may be formed on the areas of the bonded surfaces of the ferrite blocks 20A, 20B. The undercoat made of a glass material does not substantially act as a gap where the thickness of the glass undercoat is no more than 100 angstroms. When the undercoat is made of a magnetic material, the undercoat does not substantially exhibit a magnetic effect, where the thickness is no more than 1000 angstroms.

While the presently preferred embodiments of the present invention have been described for illustrative purpose only, it is to be understood that the invention is not limited to the details of the illustrated embodiments, but may be embodied with various changes, modifications and improvements, which may occur to those skilled in the art, without departing from the spirit and scope of the invention.

In the illustrated embodiments, the track-width defining cutout 42 provided on either side of the magnetic gap 40 of the magnetic head core is defined by only one pair of ridges 38A, 38B formed on the two ferrite blocks 20A, 20B. However, two or more pairs of successive ridges 38A, 38B may be provided on either side of the magnetic gap 40.

Figure 7:
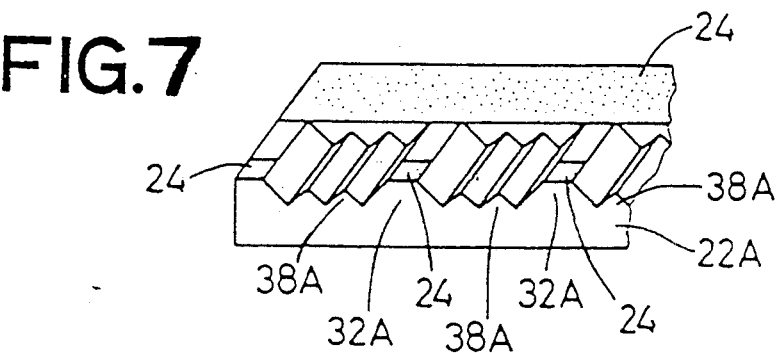

While one of the two magnetic-gap defining protrusions 32A, 32B of the ferrite blanks 22A, 22B is subjected to an etching operation through the etching mask 24 as shown in FIG. 7 in order to give the magnetic gap 40 having a desired amount, the etching operation may be replaced by the provision of a non-magnetic film which is formed, as by sputtering, on the end face of at least one of the magnetic-gap defining protrusions 32A, 32B. In this case, the thickness of the non-magnetic film or total thickness of the non-magnetic films determines the amount of the magnetic gap 40.

In bonding the ferrite blanks 22A, 22B together, the bonding filler 44 may be first applied to the appropriate portions of the blanks 22A, 22B before the two blanks are butted together. In this case, the applied masses of the bonding filler 44 are ground to remove the unnecessary portions and provide smooth mutually abutting surfaces, before the blanks 22A, 22B are butted and bonded together.

While the illustrated magnetic head cores are adapted for use with a video tape recorder, it is to be understood that the principle of the invention is not limited to the VTR magnetic head core, but is equally applicable to R-DAT and RDD magnetic head cores. Although each of the illustrated magnetic head cores consists of two ferrite blocks bonded together, the magnetic head core according to the invention may consist of three bonded ferrite blocks, as illustrated in FIG. 13. In this embodiment wherein the three bonded ferrite blocks are indicated at 20A, 20B, 20C, the two ferrite blocks 20A, 20B cooperate with each other to provide a writing/reading magnetic gap formed according to the principle of the invention (two ridges 38A, 38B provided on either side of the gap, contrary to one ridge 38A, 38B in the preceding embodiments), while the ferrite blocks 20B, 20C cooperate with each other to provide erasing magnetic gaps 52, 52 which are formed on both sides of trackwidth defining cutout 54 similar to the cutouts 42 of the preceding embodiments.

What is claimed is:

1. A magnetic head core including two ferrite blocks bonded together to form a magnetic path, said two ferrite blocks having opposed surface regions and comprising respective two protrusions which protrude from respective first portion of said opposed surface regions and have opposed flat end faces cooperating with each other to define a magnetic gap therebetween, said opposed surface regions of said two ferrite blocks having respective second portions cooperating with said two protrusion to define two cutouts formed on opposite sides of said magnetic gap, such that a spacing provided between said opposed surface regions by each of said two cutouts is larger than an amount of spacing of said magnetic gap between said flat end faces, said cutouts defining an effective width of a track of the head core in which said magnetic gap is open, wherein the improvement comprises:

each of said two protrusions of said ferrite blocks having a flat end face, and two side surfaces each of which is inclined at an angle of 25°-75° with respect to a plane including said flat end face; and each of said two cutouts being defined by at least one pair of opposed ridges which are formed on said opposed surface regions of the two ferrite blocks, respectively, such that each of said opposed ridges is disposed on each side of a corresponding one of said protrusions.

2. A magnetic head core according to claim 1, wherein said angle of inclination of said side surfaces with respect to said plane is held within a range of 40°–75°.

3. A magnetic head core according to claim 1, wherein each of said at least one pair of ridges is defined by two inclined side surfaces each of which is inclined at an angle of 10°–70° with respect to said plane.

4. A magnetic head core according to claim 1, wherein at least one of said two ferrite blocks has a magnetic film which covers at least the flat end face of the corresponding one of said two protrusions, said magnetic film being formed of a magnetic material which has a higher saturation magnetic flux density than said ferrite blocks.

5. A magnetic head core according to claim 4, wherein said magnetic film further covers said side surfaces of said corresponding one of said two protrusions, and a corresponding one of said opposed ridges.

6. A magnetic head core according to claim 4, wherein said two cutouts are filled by respective bonding fillers.

7. A magnetic head core according to claim 4, wherein said magnetic film is formed by sputtering.

8. A magnetic head core according to claim 1, wherein the end faces of said two protrusions have different widths.

* * * * *